Sept. 3, 1968   C. F. H. CRATHERN III   3,400,031
REGISTRATION APPARATUS

Filed Aug. 4, 1964   3 Sheets-Sheet 1

CHARLES F. H. CRATHERN III
*INVENTOR.*

Sept. 3, 1968    C. F. H. CRATHERN III    3,400,031
REGISTRATION APPARATUS

Filed Aug. 4, 1964    3 Sheets-Sheet 2

CHARLES F. H. CRATHERN III
INVENTOR

3,400,031
REGISTRATION APPARATUS
Charles F. H. Crathern III, Gould Hill,
Contoocook, N.H. 03229
Filed Aug. 4, 1964, Ser. No. 387,440
12 Claims. (Cl. 156—364)

ABSTRACT OF THE DISCLOSURE

This invention relates to an apparatus which orients a pair of sheet members, one with respect to the other, in a predetermined relation, and adhesively unites these sheets. One of the sheet members is held stationary while the other is supported thereabove on an articulated frame powered so as to orient itself with respect to the stationary sheet. Photo-cell units carried by this articulated frame coact with power means which activate the frame (and the sheet material carried by it) into proper position.

---

This invention relates to registration apparatus and more particularly to registration apparatus employed in the laminating of a sheet material or "wrap" to a corresponding supporting surface and which requires accurate positioning of one with respect to the other before being brought into contact. The supporting surface may be plane, as for example another sheet material, or may be in the nature of a box or cylindrical container.

In the field of adhesively applying a cover sheet to a supporting surface in face to face relation, there is, in many instances, a requirement that the sheet be pre-positioned with respect to the other surface before they are brought into adhesive contact. Such sheet lamination is generally performed on a continuous basis by having an intermittently operated conveyor belt carry a series of adhesively faced cover sheets or wraps in spaced relation, and passing them consecutively under stack-fed pieces of supporting material, one by one, where they are brought into contact with each other. Though as indicated above, this supporting surface comprehends such items as the outer surfaces of boxes and cylindrical containers along with other sheet material, for convenience of description, this disclosure will refer to all such supporting surfaces merely as sheet material.

In those instances where accurate alignment of the two sheets is important preparatory to being brought together, various forms of registration apparatus have been developed. Such apparatus has, in most instances, been of the type which orients the entire conveyor belt or attempts to accurately control the positioning of the cover sheet material on the conveyor so as to give reasonably close register with respect to the mating sheet material subsequently brought into contact therewith. Although such prior art devices have served their purpose, they have not generally proven to be adaptable to existing conveyor and sheet laminating systems. Accordingly, those segments of industry having a requirement for accurate alignment of sheet material in preparation for laminating them together have not been able to convert existing systems to accomplish accurate registration, but had, for the most part, to satisfy their needs by purchasing new equipment having built-in registration features. Such a capital expenditure is oftentimes prohibitive in nature and, accordingly, much of industry's efforts to achieve an accurate registration of a sheet to a supporting surface is therefore done manually, particularly in the manufacture of such items as phonograph record jackets.

In this industry, these jackets are generally comprised of a pre-printed cover sheet laminated to a stiff cardboard member. In many instances, the pre-printed cover sheets carry the name of the record on the face thereof in such a location that when assembled with the cardboard stiffener, the record name appears on the edge of the jacket which facilitates identification when these jackets containing their records are stacked in storage. Even in those instances however where there is no resultant edge printing on the completed record jacket, the requirement for accurate alignment of the pre-printed cover on the supporting cardboard stiffeners is still present.

Since substantially all registration or positioning of the pre-printed cover sheets on the cardboard stiffeners in the manufacture of phonograph record jackets is now done manually, item by item, those concerned with the development of such sheet registration apparatus have long recognized the need for automated equipment exhibiting the ability to precisely align the sheet components preparatory to laminating them together. A need has particularly existed for equipment of an accessory nature which can be adapted to existing conveyor systems. This invention fulfills this need by introducing novel structural features of alignment apparatus heretofore not available in the prior art.

In general, this invention provides an apparatus comprised of a selectively traversable articulated support means, mountable in conjunction with a conventional belt-type conveyor and adapted to receive and carry a piece of cardboard or other supporting surface in spaced relation above the piece or pieces of pre-printed cover sheets carried by the conveyor, and aligning the cardboard sheet (by virtue of the traversable support) with respect to the conveyor carried sheet, and then bringing these sheets into adhesive contact under pressure.

Though these concepts have a wide variety of applications which will become obvious in light of the hereinafter disclosures, I have, for purposes of description and illustration, selected the field of manufacturing phonograph record jackets as typical of these areas of application.

It is, accordingly, among the objects of this invention to provide an alignment apparatus for accurately bringing into pre-determined register initially unaligned sheet material carried in spaced apart parallel relation with respect to each other.

Another object of this invention is to provide a sensitively controlled pneumatic-hydraulic system for use with this apparatus for aligning into pre-determined register parallelly disposed sheet material.

Yet another object of this invention is to provide a registration apparatus of an accessory nature which may be easily adapted to any conventional sheet conveying system to provide such existing systems with a capability of accurately aligning parallelly disposed sheet material preparatory to bringing them into adhesive contact with each other.

It is a still further object of this invention to provide a registration apparatus which acts in spaced relation from a conventional belt-type conveyor and orients the sheet material or other supporting surface received by it with respect to the corresponding pre-printed sheet material carried by the conveyor belt even though such sheet material may lie in any askewed horizontal position.

Still another object is to provide a registration apparatus of the type hereinafter described which exhibits features of economy of production and ease of maintenance and which substantially eliminates the need for frequent adjustment and readjustment.

With these and other objects in view, as will hereinafter more fully appear and which will be more particularly pointed out in the appended claims, reference is now made to the following description taken in connection with the accompanying drawings in which:

Figure 1:
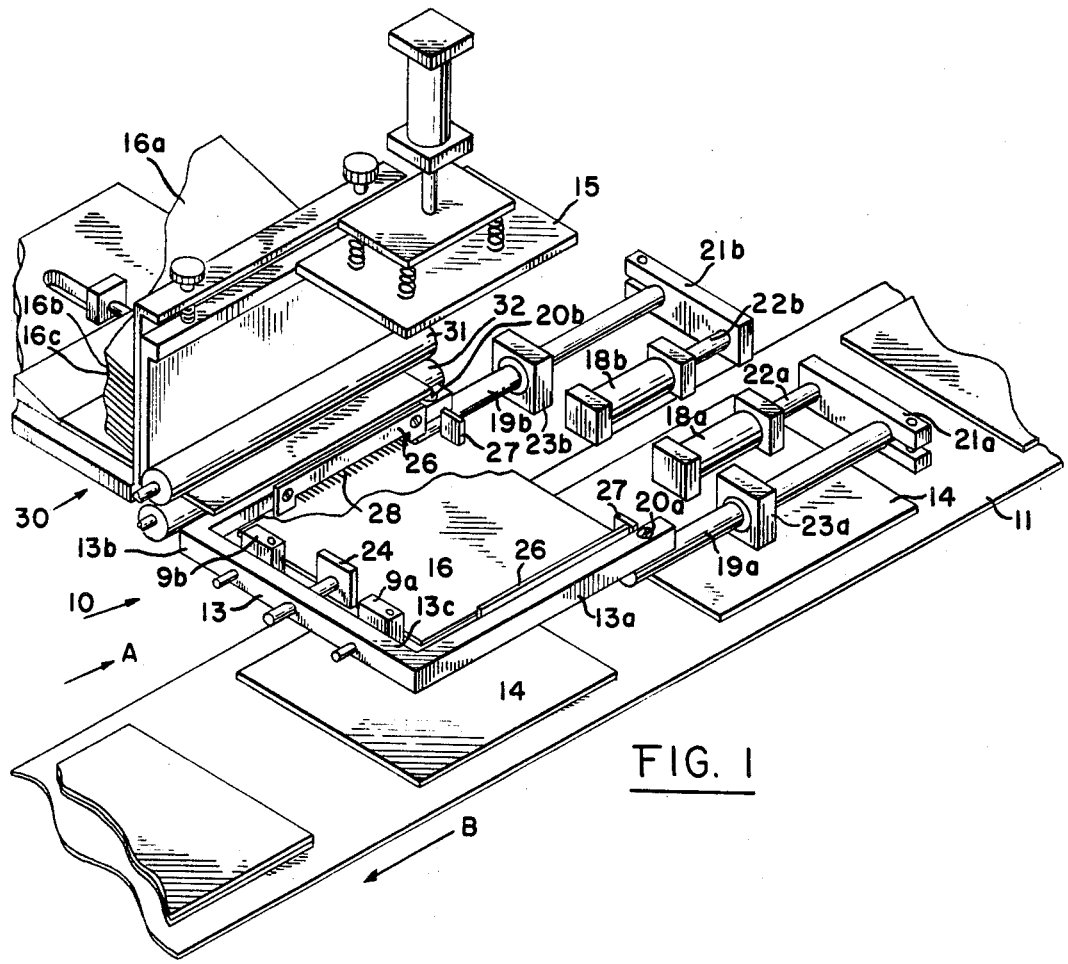
FIGURE 1 illustrates a perspective schematic view of the registration apparatus in conjunction with a ram press and conveyor system.

Referring generally now to the drawings, there is depicted in FIGURE 1 the registration apparatus 10 mounted over a conventional conveyor 11 of the type generally employed in the paper box industry. Conventional glue applicators (not shown) deliver adhesively faced pre-cut sheets of paper 14 to conveyor 11 which carries them in the direction of Arrow B in spaced relation thereon underneath alignment frame 13 in an intermittently timed stop-and-go motion. Each sheet of glued paper 14 comes to a complete stop somewhere under alignment frame 13 which carries a cardboard sheet 16. The cardboard sheets 16 are delivered one by one to the frame 13 from a conventional stack-feeder 30 by means of driven rollers 31, 32. Hydraulic cylinders 18a, 18b, in cooperation, respectively, with photo-electric sensing means 17a, 17b (FIGURE 2), actuate and move alignment frame 13 in the direction of Arrow A so as to vertically align cardboard 16 with glued sheet 14. Plunger 15 then descends transferring and momentarily compressing cardboard 16 to the glued surface of sheet 14.

It should be noted at this point that photo-electric sensing means 17a, 17b, carried on frame 13 are each independently connected to and operable with hydraulic cylinders 18a, 18b, respectively.

Referring to the details of the drawings with greater particularity, the registration apparatus 10 is comprised of an alignment frame 13 whose side portions 13a and 13b are fixedly attached to cross member 13c. Side portions 13a, 13b are respectively connected in pivotal relation to one end of rods 19a and 19b by pivot pins 20a and 20b. Members 23a, 23b are bearings for slidably supporting each rod 19a, 19b. The other end of each of rods 19 is attached respectively to block members 21a and 21b which are each then respectively attached to a hydraulic piston 22a and 22b that operate independently of one another from hydraulic cylinders 18a, 18b.

Cross member 13c of the alignment frame carries an axially adjustably mounted end stop member 24 and a pair of axially adjustable support blocks 9a, 9b which carry photo-electric cells 17a, 17b and light sources 40a, 40b. The inner opposed surfaces of alignment frame members 13a and 13b each carry a side guide 26. Mounted on each side guide, in substantially coplanar relation with each other, are elongated brush means 28 adapted to carry and support cardboard sheet 16. Cardboard sheet 16 is fed onto brush supports 28 by the rollers 31, 32 of a conventional feed mechanism 30 from a stacked supply of cardboard sheet members 16a, 16b, 16c, etc. Though the disclosed embodiment describes the cardboard support as brush means 28, these means may be of any suitable resilient construction which can support the cardboard or other material and yet allow it to pass vertically downward onto conveyor 11 when forcibly acted on by plunger 15 at the appropriate time.

As driven rolls 31, 32 deliver cardboard 16 on to the brush means 28, back stops 27 in conjunction with end stop 24 and side guides 26 serve to limit transverse movement of cardboard sheet 16 with respect to alignment frame 13 and thereby fix and hold its position relative to the frame.

Figure 1A:
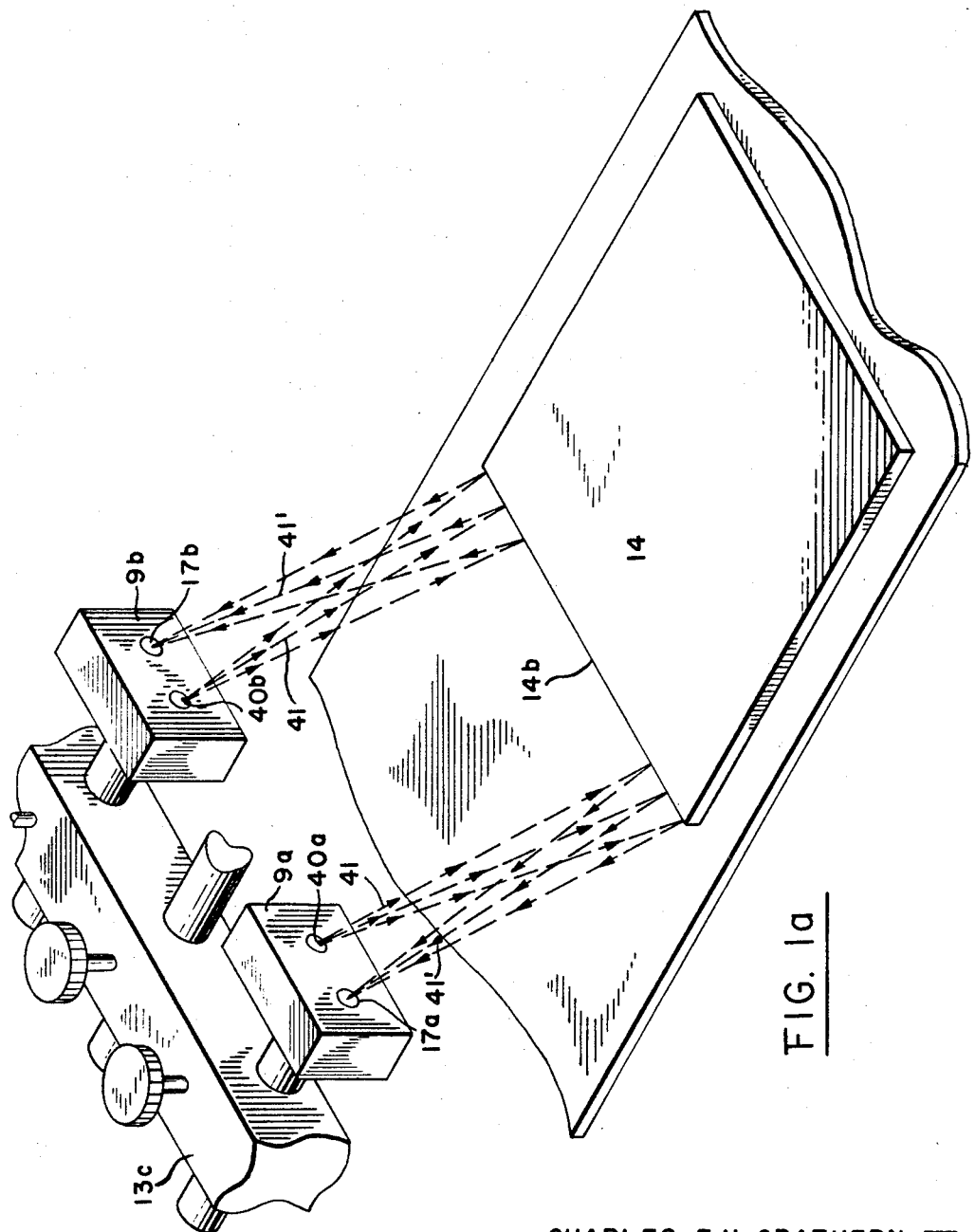
FIGURE 1a illustrates a partial section of FIGURE 1.

The operation of photo-cell 17a and its associated light source 40a depicted in FIGURE 1a, is as follows: The light beam 41 is angularly directed toward conveyor belt 11. As alignment frame 13 moves in the direction of arrow A by virtue of pressurization of hydraulic cylinder 18a, light beam 41 falling on conveyor 11 also moves toward sheet 14. When this light beam reaches the edge 14b of sheet 14, a portion of it is reflected back as beam 41' to the sensing unit 17a generating a signal which is conventionally amplified to initiate the power means for halting the advancement of hydraulic piston 22a in a manner hereinafter described. Block 9b continues to advance along with its portion of frame 13 pivoting about pivot 20a until light beam 41 from source 40b intersects with edge 14b so as to function with its similar arrangement of parts operating in conjunction with sensing unit 17b, for stopping the further movement of piston 18b.

It should be observed that (1) the spatial relation of sheet member 16 relative to photo-cells 17a, 17b, as determined by stop elements 24 and 27, and (2) the angular orientation of the projected light beams 41 with respect to conveyor belt 11 can be predetermined in any given system. Thus by proper selection and adjustment of the stop elements and angular orientation of light sources 40a, 40b, along with suitable adjustment of photo-cells 17a, 17b, cardboard 16 may be placed over any selected area of sheet 14.

In operation, the device functions in sequence as follows: a cardboard blank 16 is fed into alignment frame 13 from a conventional feeding mechanism 30 and rests on a pair of resilient supports as, for example, the two elongated brush means 28. Each brush means 28, disposed between end stop 24 and back stop 27 is rigidly attached to a side guide 26. During this time interval the conveyor 11 advances glued sheet 14 to a stop position somewhere under frame 13, but not beyond the point where light beams 41 intersects the conveyor belt.

Hydraulic cylinders 18a and 18b are then pressurized by suitable power means hereinafter described, thereby causing the frame 13 carrying light sources 40a, 40b photo-cells 17a, 17b and cardboard 16 to advance in the direction of arrow A. This advancement continues at a regulated speed by virtue of flow control valves 56a, 56b until each photo-cell 17a, 17b senses a light intensity reflected from the edge 14b of glued sheet 14 whereupon its respective solenoid valve 55a, 55b closes to stop the flow of hydraulic fluid in conduits 54a, 54b thereby stopping the further movement of pistons 18a, 18b and frame 13. At this time a positive pressure however is still maintained on the up-stream side of the hydraulic piston, that is in conduit 53, and this therefore has the effect of locking the piston and, in turn, the frame 13, in place. Cardboard blank 16 is now aligned with glued sheet 14 on conveyor 11. At this time, plunger 15 forcibly descends against cardboard blank 16 pushing it through the resilient supporting brushes 28 and into pressured contact with the glued surface of sheet 14. As plunger 15 retracts, pistons 18a, 18b also retract so as to reposition frame 13, whereupon a new cardboard blank is fed to the frame. At this time conveyor 11 advances another stop thereby placing a new sheet 14 in some proximate location under frame 13 to repeat the cycle.

It should be noted that each of photo-cells 17a, 17b independently controls its respective hydraulic cylinder 18a, 18b and corresponding frame element 13a, 13b pivotally connected to rods 19a, 19b. Notwithstanding that the sheet 14 may be in an askewed position on the conveyor at the end of its travel, alignment frame 13 and cardboard 16 will be correspondingly aligned with such a sheet at the end of the alignment cycle. The independent cooperation of each photo-cell 17a, 17b with its respective hydraulic cylinder 18a, 18b and the articulated connection of frame 13 to rods 19 will permit the frame 13 to advance in the direction of arrow A by a combination traversing and rotation as required about pivots 22a or 22b to orient itself with respect to sheet 14 on conveyor 11.

Operation of power means

Figure 2:
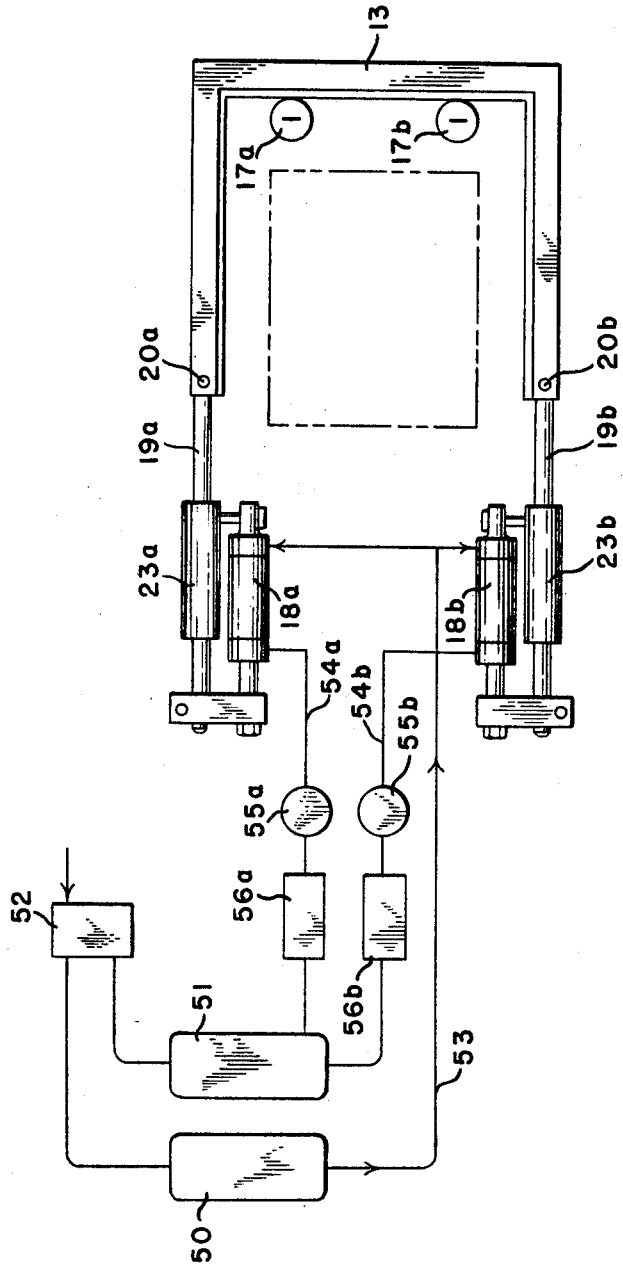
FIGURE 2 depicts a schematic representation of the registration apparatus and associated power control.

The hydraulic-pneumatic-electric circuits, depicted schematically in FIGURE 2, consists of two "air over oil" tanks 50, 51 that are partially filled with hydraulic oil. These tanks are alternately pressurized with compressed air (depending on whether hydraulic pistons 22a, 22b are to be extended or retracted) by means of the four-way solenoid valve 52, from a conventional high pressure source (not shown) thus generating a predetermined hydraulic pressure in each of cylinders 18a, 18b.

When conveyor 11 stops (as hereinabove described), four-way valve 52 is actuated to permit pressurized air flow into tank 50 while tank 51 is vented to the atmosphere. This permits hydraulic oil to flow through conduit 53 to hydraulic cylinders 18a, 18b causing each cylinder piston to extend and thereby move frame 13 and its appended photo-cells 17a, 17b in the direction of arrow A.

While pressurized oil is being delivered to the inlet side of cylinders 18a, 18b, conduits 54a, 54b carry the oil displaced by pistons 22a, 22b away through flow valves 56a, 56b respectively, into vented tank 51. Frame 13 continues moving in the direction of A, and when, for example, photo-cell 18a detects the edge 14b of glued sheet 14 on conveyor 11 by virtue of the reflected light intensity hereinbefore described, an electric signal is generated and amplified which causes solenoid valve 55a to close, thereby stopping the flow of oil in conduit 54a which in turn prevents further extension of hydraulic piston 22a halting further linear movement of frame element 13a. It should be noted at this point that a positive pressure is still maintained at the inlet side of the cylinder 18a, thus effectively locking the position of this piston and the co-operating elements connecting it to frame member 13a. Frame element 13b continues its movement causing frame 13 to now rotate about pivot 20a and when photo-cell 17b detects the edge 14b of sheet 14, an electric signal is generated and amplified which causes solenoid valve 55b to close thereby preventing further extension of hydraulic cylinder 22b in the same manner described for frame element 13a.

The cardboard 16 in frame 13 is now vertically aligned in predetermined relation with the sheet 14 on conveyor 11. Each of the photo-cell units 17a, 17b are connected in series to the plunger 15 so that when the last photo-cell unit is energized, it not only stops the further advancement of frame 13, but also closes the electrical circuit which causes plunger 15 to descend and push cardboard 16 past the resilient brush support 28 and into contact with the adhesive surface of sheet 14. At the conclusion of this operation, valve 52, activated by the motion of plunger 15, repositions itself so as to vent tank 50 and pressurize tank 51 causing a reversal of flow of hydraulic oil into cylinders 18a, 18b thereby retracting pistons 22a, 22b and returning frame 13 to its original position ready for the next cycle.

Though the hereinabove description discloses a preferred embodiment, it is to be expressly understood that the apparatus set forth is merely illustrative of the broad invention itself, namely, an automated device for accurately registering a plurality of non-aligned pieces of sheet material into predetermined relation with one another.

Various modifications of the equipment may be made, for example, the brush means 28 may be replaced with any suitable resilient support which will carry the cardboard or other sheet material and permit the plunger 15 to push this sheet past such support without experiencing any damage. Similarly, the described four-way solenoid valve 52 could be replaced by a hydraulic pump and a four-way valve combination. Also, pivots 20a, 20b may be located closer to photocells 17a, 17b to achieve greater flexibility in the aligning of frame 13 with respect to the sheet material carried on conveyor 11. These changes are merely illustrative and are not intended to be exhaustive.

Accordingly, it will be understood that various changes in the details, materials, set-ups and arrangement of parts which have been herein described and illustrated in order to explain the nature of the invention, may be made by those skilled in the art within the principle and scope of the invention as expressed in the appended claims.

What is claimed and desired to be secured by United States Letters Patent is:

1. An apparatus for aligning and laminating sheet material, comprising in combination:
   (a) conveyor means for carrying a plurality of adhesively faced first sheets in spaced apart serial relation;
   (b) articulated support means in spaced parallel relation to said conveyor means for carrying a second sheet;
   (c) powered actuating means for orienting said support means with respect to said carrier; and
   (d) reciprocating means acting in timed relation for forcibly transferring said second sheet from the support means into adhesive face-to-face relation with the aforementioned one of said first sheets.

2. An apparatus for aligning and laminating sheet material, comprising in combination:
   (a) means for providing a plurality of adhesively faced first sheets;
   (b) a movable frame juxtaposed in parallel spaced relation to said means;
   (c) independently actuatable power means connected to said frame for vertically aligning the frame with respect to one of said first sheets;
   (d) yieldable support means carried by said frame for supporting a second sheet; and
   (e) reciprocating means for transferring said second sheet from its support means into adhesive face-to-face relation with the aforementioned one of said first sheets.

3. An apparatus for aligning and laminating sheet material, comprising in combination:
   (a) conveyor means for carrying a plurality of adhesively faced first sheets in spaced serial relation;
   (b) a peripheral U-shaped frame member, for carrying a second sheet, in spaced parallel relation to said conveyor and movable with respect thereto;
   (c) a plurality of independently operable power means connected to said U-shaped frame member for translation and rotation of a second sheet into vertical alignment with one of said first sheets; and
   (d) means for transferring said second sheet from the U-shaped frame into adhesive face-to-face relation with the aforementioned one of said first sheets.

4. A registration apparatus for aligning and laminating sheet material, comprising in combination:
   (a) means for carrying a plurality of adhesively faced first sheets in spaced serial relation;
   (b) a peripheral U-shaped frame in spaced, parallel, movable relatiton to said conveyor for carrying a second sheet;
   (c) a plurality of independently operable photo-cell units carried by said frame, each responsive to light energy reflected from the surface of one of said first sheets;
   (d) a plurality of independently operable power means pivotally connected to said U-shaped frame member and coacting with said photo-cell units for positioning a second sheet carried thereby into vertical alignment with the aforementioned one of said first sheets; and
   (e) means for transferring said second sheet from the peripheral frame into adhesive face-to-face relation with the aforementioned one of said first sheets.

5. The structure set forth in claim 4 wherein said power means comprises:
   (a) a hydraulically actuated piston wherein fluid on each side thereof is alternately pressurized and vented, respectively, for producing a reciprocating motion; and
   (b) a selectively operable valve means on one side of said piston for arresting the flow of fluid being displaced by the movement of said piston as pressurized fluid is acting on the other side thereof whereby to effectively lock said piston in position.

6. An apparatus for aligning and laminating sheet material, comprising in combination:
   (a) a conveyor for carrying a plurality of adhesively faced first sheets in spaced serial relation;
   (b) a movable peripheral frame means in spaced parallel relation to said conveyor;
   (c) yieldable support means attached to opposed longitudinal inner surfaces of said frame for carrying a second sheet;
   (d) means for selectively delivering a second sheet to said support means;
   (e) power means operable with said frame means for orienting said second sheet in predetermined relation to one of said first sheets; and
   (f) means for forcibly transferring said second sheet from the frame means into adhesive face-to-face relation with the aforementioned one of said first sheets.

7. The structure of claim 6 wherein said power means includes:
   (a) a pair of independently operable hydraulic cylinders connected to said frame in pivotal relation;
   (b) sensing units mounted on said frame and cooperating with said power means;
   (c) said sensing units being comprised of a pair of light sources and a pair of photo-electric cells each associated with one of said light sources; and
   (d) said photo-cells being oriented on said frame to be responsive to light energy reflected from the edge of one of said adhesively faced first sheets by a light beam directed thereagainst from the aforesaid light source.

8. An apparatus for laminating pre-printed sheet material in predetermined registration with other sheet material, comprising in combination:
   (a) intermittently moving conveyor means for carrying a plurality of adhesively faced pre-printed facing sheets, glue side up, in spaced serial relation;
   (b) a reciprocating alignment frame disposed in spaced parallel relation to said conveyor means;
   (c) said alignment frame being pivotally connected to a pair of independently operable power means for reciprocating said frame at regulated intervals;
   (d) a pair of light sources and a pair of photo-cell units carried by said reciprocating frame, each photo-cell unit being responsive to light energy reflected from the edge of one of said pre-printed facing sheets resulting from a light beam directed thereagainst from the aforesaid light sources;
   (e) resilient support means in coplanar relation on opposed inner edges of said frame;
   (f) means for regulated feeding of substantially rigid sheet material onto said resilient support means; and
   (g) power actuated means for forcibly transferring said rigid sheet material through said resilient support means into contact with one of said pre-printed facing sheets.

9. An apparatus for laminating pre-printed sheet material in predetermined registration with other sheet material, comprising in combination:
   (a) means for carrying a plurality of adhesively faced pre-printed facing sheets, glue side up, in spaced apart serial relation;
   (b) a movable alignment frame vertically disposed in spaced relation above one of the aforesaid facing sheets;
   (c) said alignment frame being pivotally connected to independently reciprocating power means co-acting with said frame for traversing and rotating at a regulated speed;
   (d) sensing means carried by said frame for detecting at least two points along one edge of the aforesaid facing sheets, each of the sensing means independently co-acting with its respective said reciprocating power means; and
   (e) power actuated means acting in timed relation for transferring rigid sheet material carried by the alignment frame to the aforementioned adhesively faced pre-printed facing sheet.

10. Registration apparatus for aligning and laminating sheet material, comprising in combination:
    (a) intermittently actuated conveyor means for carrying a plurality of adhesively faced sheets in spaced serial relation;
    (b) a peripheral frame in spaced apart parallel relation to said conveyor means;
    (c) power means connected in pivotal relation to said peripheral frame for movement thereof;
    (d) resilient support means in coplanar relation on opposed inner edges of said frame;
    (e) means for feeding substantially rigid sheet material onto said resilient support means;
    (f) sensing means coacting with said power means for vertically aligning said rigid sheet with one of said adhesively faced sheets; and
    (g) power actuated means for forcibly transferring said rigid sheet material through said resilient support means into contact with one of said adhesively faced sheets.

11. Apparatus for aligning and laminating sheet material, comprising in combination:
    (a) an intermittently actuated conveyor means for carrying adhesively faced material in spaced serial relation;
    (b) a plurality of actuating means;
    (c) an alignment frame at one end of said conveyor in spaced, parallel relation thereto, each side thereof being pivotally connected to a respective one of said actuating means for moving said frame;
    (d) resilient support means mounted on the inner opposed sides of said frame;
    (e) means for discharging substantially rigid sheet material onto said support means;
    (f) a plurality of sensing means carried by said frame, each respectively controlling a corresponding one of said actuating means; and
    (g) plunger means operating in timed relation with said sensing means for transferring said substantially rigid sheet material through said resilient support means into contact with said adhesively faced material.

12. The structure of claim 11 wherein:
    (a) said frame carries a pair of light sources; and
    (b) said sensing means are comprised of a pair of photo-cell units each of which is responsive to light energy reflected from the edge of one of said adhesively faced material from a light beam directed thereagainst from the aforesaid light sources.

References Cited

UNITED STATES PATENTS

| | | | |
|---|---|---|---|
| 2,384,768 | 9/1945 | Rau | 156—364 |
| 3,249,483 | 5/1966 | Kauffman et al. | 156—364 |

EARL M. BERGERT, *Primary Examiner.*

M. L. KATZ, *Assistant Examiner.*